(12) United States Patent
Saha

(10) Patent No.: US 7,500,087 B2
(45) Date of Patent: Mar. 3, 2009

(54) SYNCHRONIZATION OF PARALLEL PROCESSES USING SPECULATIVE EXECUTION OF SYNCHRONIZATION INSTRUCTIONS

(75) Inventor: Bratin Saha, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 10/797,886

(22) Filed: Mar. 9, 2004

(65) Prior Publication Data

US 2005/0204119 A1     Sep. 15, 2005

(51) Int. Cl.
*G06F 9/00* (2006.01)
(52) U.S. Cl. ..................................... 712/235
(58) Field of Classification Search ................. 712/235
See application file for complete search history.

(56) References Cited

U.S. PATENT DOCUMENTS

| 5,428,807 | A | | 6/1995 | McKeen et al. |
| 6,009,512 | A | * | 12/1999 | Christie ................... 712/226 |
| 6,230,230 | B1 | | 5/2001 | Joy et al. |

OTHER PUBLICATIONS

Speculative Lock Elision (Rajwar).*
Enhancing Software Reliability with Speculative Threads (Lam).*
Transactional Memory: Architectural Support for Lock-Free Data Structions by Herlihy and Moss.*
Kawachiya et al., "Lock Reservation: Java Locks Can Mostly Do Without Atomic Operations", ACM, 2002, pp. 130-140.*
Rajwar, Speculative lock elision: enabling highly concurrent multithreaded execution, Publication Date: Dec. 1-5, 2001.*
Lam, Enhancing software reliability with speculative threads, vol. 36, Issue 5 (Dec. 2002).*
Dean M. Tullsen et al., "Simultaneous Multithreading: Maximizing On-Chip Parallelism", Proceedings of the 22$^{nd}$ Annual International Symposium on Computer Architecture, Santa Margherita Ligure, Italy, Jun. 1995.
Professor Bill Dally, "Beyond Instruction Level Parallelism—Multithreading", EE482: Advanced Computer Organization, Processor Architecture, Lecture #12, Stanford University, May 8, 2000.

(Continued)

*Primary Examiner*—Eddie P Chan
*Assistant Examiner*—John Lindlof
(74) *Attorney, Agent, or Firm*—Fish & Richardson P.C.

(57) ABSTRACT

A speculative execution capability of a processor is exposed to program control through at least one machine instruction. The at least one machine instruction may be two instructions designed to facilitate synchronization between parallel processes. According to an aspect, an instruction set architecture includes circuitry that handles a speculative execution instruction and a speculation termination instruction. The speculative execution instruction may be an instruction that takes first and second operands, causes the processor to speculatively execute additional instructions if a memory location contains a value, and causes the processor to start executing instructions from an address indicated by the second operand if a mis-speculation occurs, and the speculation termination instruction may be an instruction that causes the processor to begin retiring the additional instructions.

23 Claims, 3 Drawing Sheets

OTHER PUBLICATIONS

Glenn Hinton et al., "The Microarchitecture of the Pentium® 4 Processor", Intel Technology Journal 1st quarter 2001, http://developer.intel.com/technology/itj/q12001/articles/art_2a.htm.

Jeffrey Oplinger et al., "Enhancing Software Reliability with Speculative Threads", ACM 1-58113-574-2/02/0010, 2002.

Haitham Akkary et al., "A Dynamic Multithreading Processor", Microcomputer Research Labs, Intel Corporation; Department of Electrical and Computer Engineering, Portland State University.

* cited by examiner

```
volatile int lock_var;      // lock_var is the lock variable
 if(lock_var==0){           // this denotes unlocked state
  loc=0;
  spec loc,shoot_down;      //begin speculation, goto shoot_down if
                            // misspeculated
  rl=lock_var;              //line 1
  if(rl==0){                //line 2
    lock_var=tid;           //line 3
  }
  commit loc,shoot_down;    //start retiring, goto shootdown on violation if(lock_var==tid){        //if true then got the lock
    CS;                     //critical section
    lock_var=0;             //unlock
    goto post_lock;
  } shoot_down:                 //there was a conflict, do the usual atomic
                            // operation
  grab lock the conventional way
  ...

post_lock:
  normal program flow
  ...
```

FIG. 5

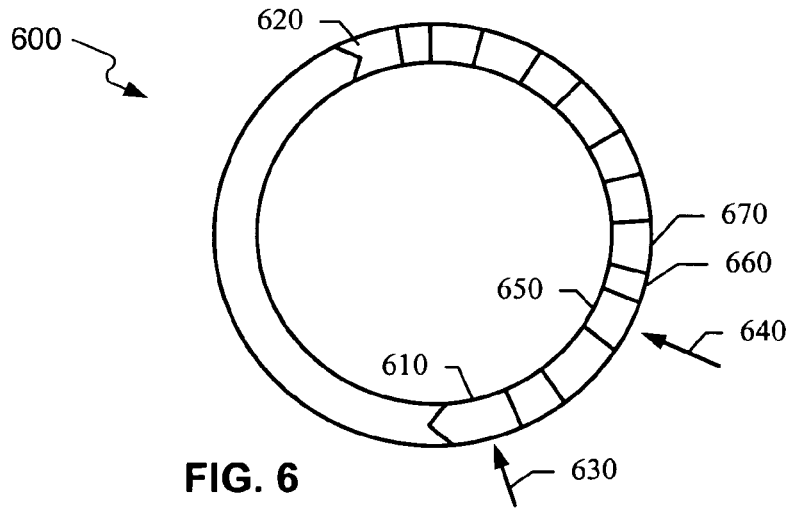

FIG. 6

SYNCHRONIZATION OF PARALLEL PROCESSES USING SPECULATIVE EXECUTION OF SYNCHRONIZATION INSTRUCTIONS

BACKGROUND

The present disclosure describes systems and techniques relating to program flow control, for example, synchronizing parallel processes.

A process is an executing software program, which may or may not share resources with other processes. Parallel processes are two or more processes that operate together in a computing system (e.g., parallel threads of a program) and share at least one system resource that may not be accessible by all the parallel processes together (e.g., a shared memory resource that may be corrupted if accessed in parallel by multiple processes). Access to such shared resources frequently needs to be synchronized, and this is typically done by placing shared-resource-access operations in a critical section of a program.

A critical section of a program may enforce serialized access to a shared resource among parallel processes. Traditionally this has been done using some form of atomic operation. An atomic operation is multiple sub-operations on a resource (e.g., read, modify and then write to a memory location) that the processor architecture forces to be performed together by not allowing multiple processes to overlap their performance of the multiple sub-operations. For example, an atomic read-modify-write instruction may be provided for use with a lock variable for a critical section; or support for a semaphore may be provided for use in controlling how many parallel processes can access a critical section. Thus, the processor architecture enables a simple shared resource to be made into a protected resource (e.g., a protected variable), which must be shared sequentially because of the processor architecture itself, allowing programmers to synchronize access to any number, and type of shared resources.

DRAWING DESCRIPTIONS

FIG. 5 illustrates an example code section implementing synchronization.

FIG. 6 illustrates a reorder buffer as may be used in a processor that supports a speculative execution instruction and a speculation termination instruction.

Details of one or more embodiments are set forth in the accompanying drawings and the description below. Other features and advantages may be apparent from the description and drawings, and from the claims.

DETAILED DESCRIPTION

Figure 1:
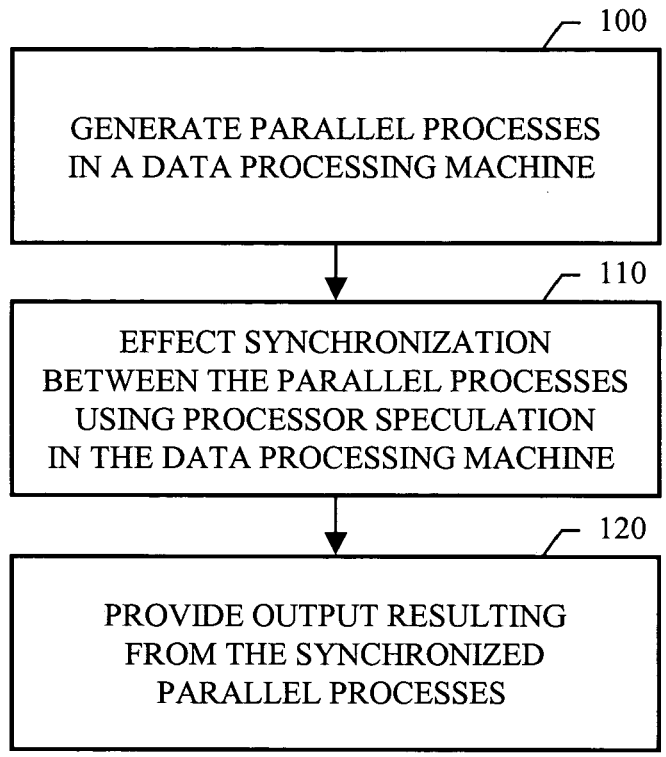
FIG. 1 illustrates synchronization of parallel processes.

FIG. 1 is a flowchart illustrating synchronization of parallel processes. Parallel processes are generated in a data processing machine at 100. For example, a software program may be run that spawns multiple threads in the data processing machine. The term "parallel processes" refers to the broad software design concept of parallel processing operations with a shared resource, and is not limited to a particular hardware and operating system design. The parallel processes are multiple threads of control, which may be parallel threads, tasks, or system processes with different process identifiers in a multitasking operating system (e.g., different Windows® processes in a Windows® operating system).

Moreover, the parallel processes may be in a uniprocessor or multiprocessor data processing machine. Thus, the fact that the processes are "parallel", does not mean they must run simultaneously, as would be possible in a symmetric-multi-processing (SMP) machine, but rather that the processes are designed so that they can run concurrently and access a shared memory resource. The parallel processes may run in any order, and thus access to the shared memory resource should be synchronized to provide the proper processing results.

Synchronization between the parallel processes is effected using processor speculation in the data processing machine at 110. The data processing machine may include an out-of-order processor/processing system that provides speculative execution of machine instructions, and this processor speculation capability is exposed to program control. Using processor speculation to implement synchronization among parallel processes may provide a significant advantage in that, if a critical section of a program happens to be uncontended at runtime (e.g., only one of the processes happens to need the critical section at a given time), then the overhead of traditional locking may be eliminated.

Synchronization can incur a large cost in modern out-of-order pipelined processors. A lock instruction is usually implemented as a serializing operation, which makes the operation expensive. In particular, a lock instruction may not execute speculatively, and in turn, this may impede the speculative execution of succeeding instructions (e.g. the critical section). This contributes to making the lock operation expensive. Modern software languages, such as Java, provide built-in support for multi-threaded programming, and thus synchronization may be a frequent operation in the programs written in these languages.

In contrast, using the speculative execution capabilities of modern processors to effect synchronization among parallel processes may significantly improve performance, especially in well tuned software, where a high percentage of the locks on a critical section may be uncontended at runtime. Output resulting from the synchronized parallel processes is provided at 120. This output may be provided to one or more other processes in the data processing machine, or to another data processing machine.

Figure 3:
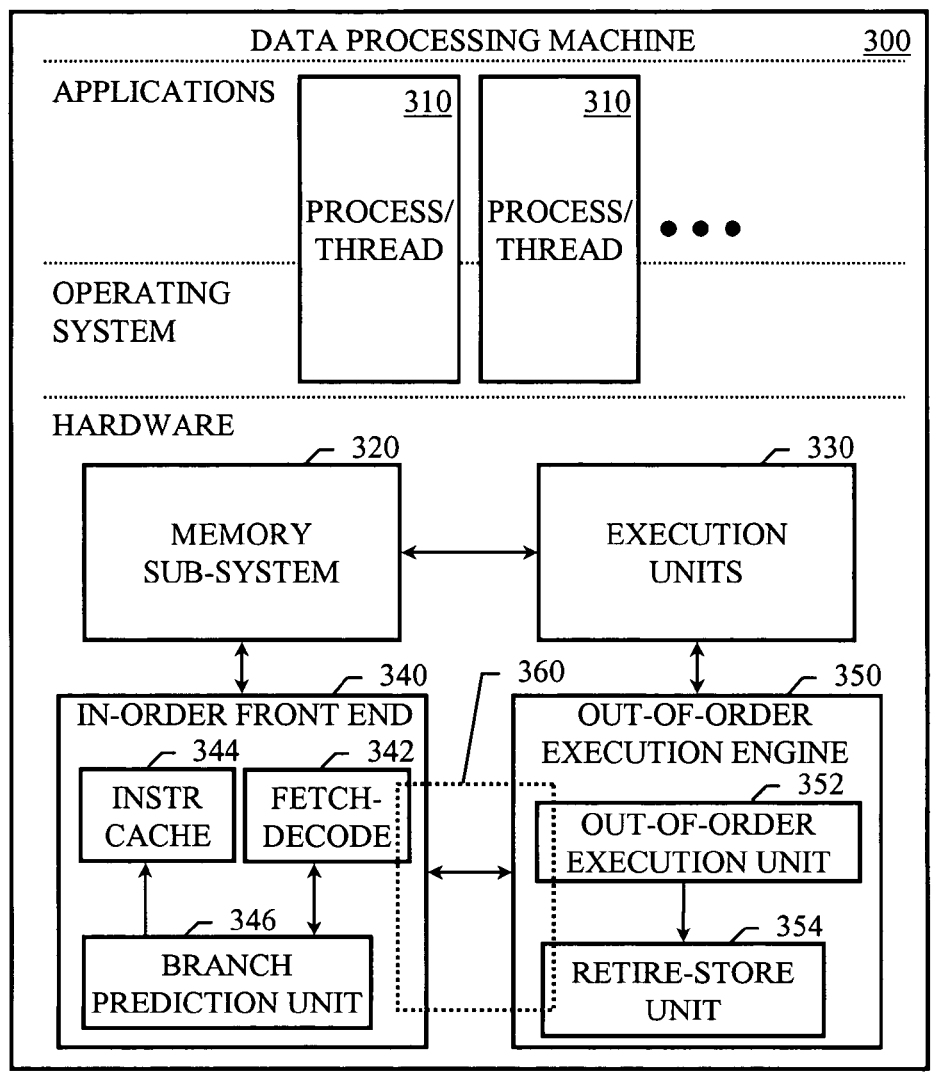
FIG. 3 is a block diagram illustrating a data processing machine.

FIG. 3 is a block diagram illustrating a data processing machine 300. The machine 300 may be a uniprocessor machine or a multiprocessor machine. The machine 300 may also employ various advanced processor architecture features, such as super-pipelining and/or hyperthreading.

The machine 300 includes two or more parallel processes 310 operating in an applications layer and/or an operating system of the machine 300. Additionally, the machine 300 includes a processor/processing system in hardware, which may be an out-of-order processor/processing system, that provides speculative execution of instructions. An out-of-order processor may include a memory sub-system 320 and execution units 330. The memory sub-system 320 may include a system bus, a bus interface unit, and a cache, which may be divided into an instruction cache and a data cache and/or into multiple levels (e.g., a level 1 cache and a level 2 cache). The memory sub-system 320 also may include a memory interface unit and memory order buffer (MOB). The execution units 330 may include integer, floating point, and multimedia (e.g., Single Instruction, Multiple Data (SIMD)) execution units.

The out-of-order processor includes an in-order front end 340 that obtains instructions, and an out-of-order execution engine 350 that re-orders the instructions received from the in-order front end 340 and provides speculative execution. The in-order front end may include a fetch-decode unit 342, an instruction cache 344, and a branch prediction unit 346. The out-of-order execution engine 350 may include an out-of-order execution management unit 352, including at least one buffer (e.g., a reorder buffer), and an in-order retire-store unit 354.

In general, one or more fetch-decode units may pull instructions from a cache and decode these instructions before placing them in an execution management back end of the processor. Decoding the instructions may involve breaking up more complex instructions into smaller micro-instructions and/or translating instructions into larger macro-instructions, depending on the processor architecture. Moreover, the out-of-order execution management unit 352 may include a dispatch-execute unit that checks instructions in a reorder buffer and processes those that have all the necessary information for execution.

The retire-store unit 354 may inspect instructions in the out-of-order execution management unit 352. The retire-store unit 354 may remove completed instructions and store instruction results temporarily until they are sent back to a cache. The retire-store unit 354 also may receive completed instructions directly from a dispatch execute unit and/or the execution units 330.

The out-of-order processor/processing system of the machine 300 has an instruction set architecture (ISA) 360 including speculative execution control circuitry that handles at least one machine instruction that facilitates synchronization between parallel processes by exposing the processor speculation to program control. For example, two new instructions, a speculative execution instruction and a speculation termination instruction, can be added to the ISA of a processor having a mechanism to execute instructions speculatively. These two new instructions can then be used to implement synchronization.

The speculative execution ("spec") instruction may take first and second operands (e.g., spec loc, addr), behave as a no-op if a memory location indicated by the first operand contains a non-zero value, cause the processor to speculatively execute additional instructions if the memory location contains a zero value, and cause the processor to start executing instructions from an address indicated by the second operand if a mis-speculation occurs. The nature of a mis-speculation during the speculative execution may depend in part on the processor architecture.

The hardware may provide invalidation based cache coherence to detect memory dependence violation, such as may be implemented using a MOB in the memory sub-system 320 and a snoop controller in a data cache unit. A processor/processing unit may maintain a queue of load addresses and snoop the bus to check whether any other processor/processing unit intends to write to a memory location that it has read. A memory dependency violation may be handled in the same way as a branch mis-prediction: the in-flight instructions may be flushed (e.g., any stores, or other changes caused to processor state by the in-flight instructions are discarded), and the processor may begin fetching from the mis-speculation address (e.g., the second operand of the spec instruction). Other approaches to detecting a memory dependency violation, and to starting execution from a different address if a misspeculation occurs, are also possible.

During the speculative execution, the processor may check for dependency violations, such as read-after-write (RAW) dependencies, to identify a mis-speculation. In a uniprocessor machine, an interrupt may be considered a mis-speculation, and thus, if a speculative instruction causes an interrupt, this may shoot down the speculation. For example, the machine hardware may keep track of clock interrupts, and a context switch in a uniprocessor implementation may be considered a mis-speculation. Moreover, multiple types of external events, such as DMA (Direct Memory Access) events, may also be treated as mis-speculation. In a multiprocessor implementation, memory dependency violations, interrupts, DMA events, etc. may all be treated as mis-speculation.

The speculation termination ("commit") instruction may cause the processor to begin retiring the additional instructions if the additional instructions have been speculatively executed. The commit instruction brings the processor out of the speculation mode initiated by the spec instruction, and while the processor is retiring the speculative instructions, the processor continues checking for a mis-speculation (e.g., an interrupt or a dependency violation) until the processor retires the commit instruction. If the processor detects a mis-speculation, it flushes any remaining speculative instructions, and starts executing instructions from the specified address. For example, the commit instruction may take first and second operands (e.g., commit loc, addr), behave as a no-op if a memory location indicated by the first operand contains a non-zero value, and cause the processor to start executing instructions from an address indicated by the second operand if a mis-speculation occurs while the processor is retiring the speculative instructions.

FIG. 5 illustrates an example code section 500 implementing synchronization according to the new approach. By way of comparison, a conventional approach to implementing synchronization through an atomic read-modify-write of a memory location is as follows:

```
volatile int lock_var;
....
grab_lock:
    if (lock_var==0) {                  //denotes unlocked state
        lock; cmpxchg lock_var, 0, tid; //atomic read-modify-write
        if (lock_var==tid){             //got the lock
            CS;                         //critical section
            lock_var=0;                 //unlock
        }
        else
            goto grab_lock;             //try again
    }
    else
        goto grab_lock;                 //try again
```

The variable lock_var denotes the memory location, where lock_var being equal to zero implies that the lock is currently free. Every process/thread in this example has a unique identifier that is given by the identifier tid. The cmpxchg is an atomic operation that compares the contents of the memory location with zero, and if the memory location equals zero, the operation then modifies the location to contain tid.

The new approach may convert the atomic read-modify-write into a speculative read-modify-write, as follows:

```
volatile int lock_var;          // lock_var is the lock variable
if (lock_var==0) {              // this denotes unlocked state
    loc=0;
    spec loc, shoot_down;       //begin speculation, goto shoot_down
                                //    if misspeculated
    rl=lock_var;                //line 1
    if (rl==0){                 //line 2
        lock_var=tid;           //line 3
    }
    commit loc, shoot_down;     //start retiring, goto shootdown on
                                //    violation
    if (lock_var==tid) {        //if true then got the lock
        CS;                     //critical section
        lock_var=0;             //unlock
        goto post_lock;
    }
shoot_down:                     //there was a conflict, do the usual
                                //    atomic operation
    grab lock the conventional way
    ...
post_lock:
    normal program flow
    ...
```

If only one process/thread tries to grab the lock at any time, then the speculative read-modify-write (lines 1, 2, and 3 above) may occur without any mis-speculation, and as a result, the read-modify-write gets committed, and hence the process/thread gets to own the lock. However, if multiple processes/threads attempt to acquire the lock at the same time, then this results in a mis-speculation because line 1 is a read from a memory location and line 3 is a write to the same memory location, thus causing a RAW dependence violation. The speculation is aborted, instructions from the shootdown label are fetched, and thus the processes/threads fall back upon the conventional method of grabbing the lock.

The syntax for the speculative execution instruction and the speculation termination instruction in this example is merely exemplary. The 'loc' (which denotes a memory location) in the commit syntax is used to identify the previously executed spec instruction. The commit forms a speculation block with the spec instruction that has the same value of 'loc' in this example. However, another syntax is also possible. For example, the commit instruction may have no operands, form a block with the previous spec instruction, and use the same shoot down address specified in the spec instruction.

FIG. 6 illustrates a reorder buffer 600 as may be used in a processor that supports a speculative execution instruction and a speculation termination instruction. The reorder buffer 600 includes a head 610 and a tail 620 of the instructions in the instruction pool. The instructions may be in the form of micro-ops or macro-ops.

The reorder buffer 600 may include a to-be-retired (TBR) pointer 630 (pointing to the head instruction 610) and a can-be-retired (CBR) pointer 640. The TBR pointer 630 indicates which instruction is being retired, and the CBR pointer 640 indicates which instructions have finished executing and can be retired. The pointers 630, 640 may be dedicated registers that hold indices into the reorder buffer 600. When the pointers 630, 640 hit a speculative execution instruction, the TBR pointer 630 may be stopped from advancing until the CBR pointer 640 hits a speculation termination instruction.

Thus, the processor does not start retiring the first instruction in the speculative block until the last instruction, and all the intermediate instructions, have been executed and are ready to retire. As shown in the reorder buffer 600, a speculative execution instruction 610 has stopped the TBR pointer 630, the CBR pointer 640 points to a current instruction 650, and a speculation termination instruction 670 has not yet been executed and cannot be executed until after an intermediate instruction 660 has been executed. Once the CBR pointer 640 reaches the speculation termination instruction 670, then the TBR pointer 630 is free to advance, and the processor begins retiring instructions again. Mis-speculation checking continues while the TBR pointer 630 advances toward the CBR pointer 640.

As the CBR pointer 640 scans the instructions in the block of instructions, the execution engine may identify any of the instructions in the block that may trigger a mis-speculation, for example an instruction that may raise an interrupt, and send a corresponding message to the front end of the processor. The entire speculative block of instructions (the instructions between the head and the tail of the ROB) may then be flushed from the pipeline, and a message to the in-order front-end may provide the address from where to begin fetching the new instructions to fill the reorder buffer 600. The circuitry used to implement this in the processor may be similar to that used in handling branch mis-prediction in current processors.

In a multiprocessor environment, a MOB may detect a memory violation and then communicate this to the front-end and the reorder buffer. This causes the in-flight instructions to be flushed and new instructions to be fetched from a different location. The MOB may keep a buffer that contains the addresses that have been read by the instructions in the reorder buffer in a first processor (the current in-flight non-retired instructions). If a different processor writes into any of these addresses, then the different processor may send an invalidation signal to the first processor to maintain cache coherency. The snoop controller in the first processor monitors the invalidation signals on the bus, and if the address of any of those signals matches any of the load addresses in the MOB, then the snoop controller/MOB sends a signal to the reorder buffer and the front-end that triggers mis-speculation and the consequent recovery.

Referring again to FIG. 5, if the acquisition of the lock is uncontended, then the entire lock-check sequence (lines 1, 2, and 3) and critical section may be performed without having to disturb pipelined processing. In particular, no dependence violations are caused, and the critical section is executed without any locking operation being required.

If multiple processes/threads attempt to grab the lock at the same time, they will execute the speculative read-modify-write sequence (line 1, line 2, and line 3). They will then execute the commit instruction and start retiring the speculative sequence. One process/thread, $T_i$, may be the first to commit the store instruction in line 3. This means that $T_i$ will have done a successful request for ownership (RFO) for the cache line containing the variable lock_var, and invalidated copies with other processors. Because the first instruction (line 1) in the speculative sequence is a load of the same memory location, the store by $T_i$ will cause a dependency violation in all the other processes/threads, and cause them to mis-speculate. Cache coherence enforces the fundamental property that stores to the same address are serialized. Thus, for stores to the same address by multiple processors, all the processors see the stores in some particular order, and all but one processor will be shot down due to the dependence violations. All other threads will branch to the code sequence in shoot_down and try to grab the lock by using the conventional atomic read-modify-write operation.

Figure 2:
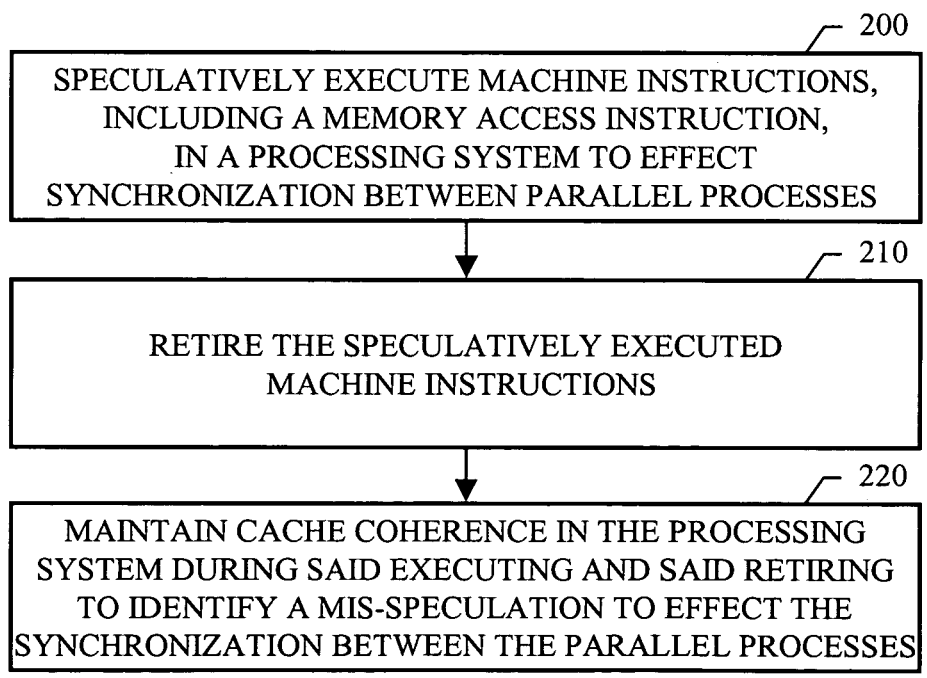
FIG. 2 illustrates synchronization of parallel processes using processor speculation and cache coherence maintenance.

FIG. 2 illustrates synchronization of parallel processes using processor speculation and cache coherence maintenance. Machine instructions, including a memory access instruction, are speculatively executed in a processing system to effect synchronization at 200. The speculatively executed machine instructions are retired at 210. Cache coherence is maintained in the processing system, during the speculative execution and the retiring of the instructions, to effect the synchronization between the parallel processes at 220. Any violation of cache coherence during the executing-retiring interval implies that synchronization was not successful. Conversely, if there was no violation, it implies that synchronization was successful.

Figure 4:
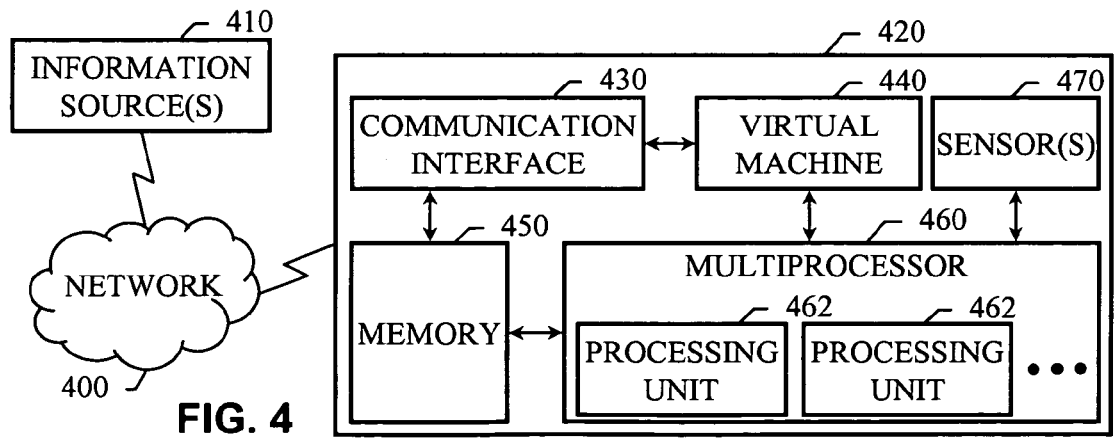
FIG. 4 is a block diagram illustrating a system including a multiprocessor.

FIG. 4 is a block diagram illustrating a system including a multiprocessor. A data processing machine 420 is communicatively coupled with one or more information sources 410 through a network 400. The machine 420 may include a communication interface 430, a virtual machine 440, and a memory 450. In addition, the machine 420 includes a multiprocessor 460, which includes multiple processors/processing units 462. The multiprocessor 460 employs the systems and techniques described, and may include multiple processing units on a single die or on multiple chips.

The machine 420 may receive software via the network 400 and send output to other data processing machines via the network 400. The virtual machine 440 may translate software information indicative of instructions into one or more machine instructions that control speculative execution in the multiprocessor 460. For example, the virtual machine 440 may be a Java virtual machine that translates multi-threaded Java code into machine instructions. In addition, one or more environmental sensors 470 may be connected with the processor to provide information regarding the environment of the machine 420, such as in the case where the machine 420 is a remote monitoring station.

The systems and techniques described here represent a new programming paradigm for implementing synchronization. This new programming paradigm may offer significant processing speed advantages for multi-threaded programs. Although only a few embodiments have been described in detail above, other modifications are possible and readily apparent from the description herein.

For example, a possible implementation of the spec instruction is to restrict the window of speculation to the reorder buffer size, and trigger a mis-speculation otherwise. If the CBR pointer reaches the TBR pointer, which implies that a commit instruction was not found inside the ROB, then a mis-speculation is triggered. The pipeline is flushed and the processor starts fetching from the mis-speculation address.

Instead of two instructions, a single speculative instruction may be provided that commits after a certain number of speculative instructions, either a fixed number of instructions or an input number of instructions. An input number N may be in a third operand, which may correspond to N instructions to speculate. Other embodiments are also possible.

In addition, the new instructions described can be used in other contexts as well. For example, they can be used for implementing non-faulting loads by putting the loads after the spec instruction. The semantics of the spec instruction ensures that the loads are committed only if they do not cause an interrupt/fault. Non-faulting loads can be used for software prefetching.

The logic flows depicted in FIGS. 1 and 2 do not require the particular order shown, sequential order, or that all operations illustrated be performed, to achieve desirable results. Other embodiments may be within the scope of the following claims.

What is claimed is:

1. A machine-implemented method comprising:
generating parallel processes in a data processing machine;
effecting synchronization between the parallel processes using processor speculation in the data processing machine to speculatively execute one or more instructions that read-modify-write a lock variable associated with a critical section and end speculation before performing the critical section; and
providing output resulting from the synchronized parallel processes;
wherein the one or more instructions comprise an instruction including an operand indicating an address from which to start executing instructions if a mis-speculation occurs.

2. The method of claim 1, wherein said generating parallel processes comprises running a software program that spawns multiple threads in the data processing machine.

3. The method of claim 1, wherein said effecting synchronization comprises translating at least one high-level software instruction into at least one machine instruction that controls speculative execution in a processor.

4. The method of claim 1, wherein said effecting synchronization comprises placing in an out-of-order execution management unit of a processor, at least one machine instruction that limits when other machine instructions are retired from the out-of-order execution management unit.

5. The method of claim 1, wherein said providing output comprises sending the output to another data processing machine.

6. An article comprising a machine-readable storage medium embodying information indicative of instructions that when performed by one or more machines result in operations comprising:
generating parallel processes in a data processing machine;
effecting synchronization between the parallel processes using processor speculation in the data processing machine to speculatively execute one or more instructions that read-modify-write a lock variable associated with a critical section and end speculation before performing the critical section; and
providing output resulting from the synchronized parallel processes;
wherein the one or more instructions comprise an instruction including an operand indicating an address from which to start executing instructions if a mis-speculation occurs.

7. The article of claim 6, wherein said generating parallel processes comprises running a software program that spawns multiple threads in the data processing machine.

8. The article of claim 6, wherein said effecting synchronization comprises translating at least one high-level software instruction into at least one machine instruction that controls speculative execution in a processor.

9. The article of claim 6, wherein said effecting synchronization comprises placing in an out-of-order execution management unit of a processor, at least one machine instruction that limits when other machine instructions are retired from the out-of-order execution management unit.

10. The article of claim 6, wherein said providing output comprises sending the output to another data processing machine.

11. A machine-implemented method comprising:
speculatively executing machine instructions, including a memory access instruction, in a processing system to effect synchronization between parallel processes, wherein the speculatively executing comprises performing a speculative read-modify-write to a lock variable associated with a critical section;

retiring the speculatively executed machine instructions to end speculation before performing the critical section; and maintaining cache coherence in the processing system during said executing and said retiring to identify a mis-speculation to effect the synchronization between the parallel processes;

wherein the machine instructions comprise an instruction including an operand indicating an address from which to start executing instructions if the mis-speculation occurs.

12. The method of claim 11, wherein said maintaining cache coherence comprises providing invalidation based cache coherence.

13. The method of claim 11, wherein said speculatively executing machine instructions comprises speculatively executing machine instructions in the processing system comprising multiple processors, and the mis-speculation comprises a memory dependency violation.

14. The method of claim 11, wherein the mis-speculation comprises at least one of an interrupt, an external event, and a memory dependency violation.

15. A system comprising:
a processor having a processor architecture that provides speculative execution of machine instructions and exposes said speculative execution to program control through at least one machine instruction; and a memory coupled with the processor, the memory embodying information indicative of instructions, including the at least one machine instruction, that result in synchronization between parallel processes when performed by the processor with detection of mis-speculation;

wherein performance of the instructions by the processor comprises performing a speculative read-modify-write to a lock variable associated with a critical section and ending speculation before performing the critical section;

wherein the at least one machine instruction comprises:
a speculative execution instruction that takes first and second operands, behaves as a no-op if a memory location indicated by the first operand contains a first value, causes the processor to speculatively execute additional instructions if the memory location contains a second value, and causes the processor to start executing instructions from an address indicated by the second operand if a mis-speculation occurs; and a speculation termination instruction that causes the processor to begin retiring the additional instructions if the additional instructions have been speculatively executed.

16. The system of claim 15, wherein the processor comprises a uniprocessor.

17. The system of claim 15, wherein the processor comprises a multiprocessor.

18. The system of claim 17, wherein the multiprocessor comprises multiple processing units on a single die.

19. The system of claim 15, further comprising:
a communication interface; and
a virtual machine that translates the information, received via the communication interface, into the at least one machine instruction.

20. The system of claim 19, wherein the virtual machine comprises a Java virtual machine.

21. The system of claim 15, further comprising an environmental sensor coupled with the processor.

22. A processing system comprising:
processing means for speculatively executing machine instructions in response to a speculative execution instruction, including means for detecting a mis-speculation;

means for treating multiple speculative instructions as a group for purposes of retirement such that the multiple speculative instructions are flushed from the processing means together and execution proceeds from an address in response to a detected mis-speculation to effect synchronization between parallel processes;

wherein performance of the instructions by the processing means comprises performing a speculative read-modify-write to a lock variable associated with a critical section and ending speculation before performing the critical section;

wherein the speculative execution instruction includes an operand indicating the address.

23. The processing system of claim 22, wherein said means for detecting a mis-speculation comprises means for maintaining cache coherence in the processing means.

* * * * *